US008239323B2

(12) United States Patent  (10) Patent No.: US 8,239,323 B2
Cleary et al.  (45) Date of Patent: *Aug. 7, 2012

(54) METHOD AND SYSTEM FOR DISTRIBUTION OF UNACTIVATED BANK ACCOUNT CARDS

(75) Inventors: Michael Cleary, Hinsdale, IL (US);
 David Clifton, Westerville, OH (US);
 Dean Ilijasic, Westerville, OH (US);
 David Cohen, New Albany, OH (US);
 Kristine Rodgers, Greenville, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2033 days.

This patent is subject to a terminal disclaimer.

(21) Appl. No.: 10/667,353

(22) Filed: Sep. 23, 2003

(65) Prior Publication Data

US 2005/0065877 A1  Mar. 24, 2005

(51) Int. Cl.
 *G06Q 40/00* (2012.01)
(52) U.S. Cl. .................................................. 705/41
(58) Field of Classification Search ............. 705/10, 705/35, 38, 39, 41
 See application file for complete search history.

(56) References Cited

U.S. PATENT DOCUMENTS

| 3,634,669 | A | 1/1971 | Wyckoff et al. |
| 3,946,206 | A | 3/1976 | Darjany |
| 4,047,033 | A | 9/1977 | Malmberg et al. |
| 4,126,779 | A | 11/1978 | Jowers |
| 4,465,206 | A | 8/1984 | Sorel et al. |
| 4,545,838 | A | 10/1985 | Minkus et al. |
| 4,582,985 | A | 4/1986 | Lofberg |
| 4,614,861 | A | 9/1986 | Pavlov et al. |
| 4,634,845 | A | 1/1987 | Riley |
| 4,689,478 | A | 8/1987 | Hale et al. |
| 4,700,055 | A | 10/1987 | Kashkashian, Jr. |
| 4,746,787 | A | 5/1988 | Okada |
| 4,750,119 | A | 6/1988 | Robertson |
| 4,752,676 | A | 6/1988 | Leonard et al. |
| 4,754,418 | A | 6/1988 | Hara |
| 4,766,293 | A | 8/1988 | Boston |
| 4,766,539 | A | 8/1988 | Fox |
| 4,789,928 | A | 12/1988 | Fujisaki |

(Continued)

FOREIGN PATENT DOCUMENTS

CA  2293321  6/1998

(Continued)

OTHER PUBLICATIONS

Richards, Bob: Beware the arrival of unsolicited debit cards, Oct. 28, 2000, Madison Capital Times, Wis., p. 1.E.*

(Continued)

*Primary Examiner* — Bijendra K Shrestha
(74) *Attorney, Agent, or Firm* — Goodwin Procter LLP

(57) ABSTRACT

The invention comprises a method for distributing dead bank cards to customers who have not solicited a bank card or submitted an application. The dead bank card is a bank card (e.g., ATM card, debit card, check card, and the like) which contains all necessary information to be used, including a pre-assigned bank account number, and which only requires activation/approval by the prospective new bank account customer. In one embodiment, the dead bank card is distributed in connection with live credit cards issued to applicants for credit card accounts. Once operative, the bank card and the credit card may be linked together through a rebate/rewards program.

37 Claims, 7 Drawing Sheets

U.S. PATENT DOCUMENTS

| | | |
|---|---|---|
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hartmut |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Kight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Henry |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,748,270 A | 5/1998 | Smith |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holmann |
| 5,789,733 A | 8/1998 | Jachimowicz et al. |
| 5,794,207 A | 8/1998 | Walker |
| 5,799,087 A | 8/1998 | Rosen |
| 5,802,176 A | 9/1998 | Audebert |

| | | | | | | |
|---|---|---|---|---|---|---|
| 5,805,719 A | 9/1998 | Pare et al. | | 6,009,415 A | 12/1999 | Shurling et al. |
| 5,806,042 A | 9/1998 | Kelly et al. | | 6,014,636 A | 1/2000 | Reeder |
| 5,806,044 A | 9/1998 | Powell | | 6,014,638 A | 1/2000 | Burge et al. |
| 5,806,045 A | 9/1998 | Biorge | | 6,014,645 A | 1/2000 | Cunningham |
| 5,807,627 A | 9/1998 | Friend et al. | | 6,014,749 A | 1/2000 | Gloor et al. |
| 5,809,478 A | 9/1998 | Greco | | 6,016,482 A | 1/2000 | Molinari et al. |
| 5,815,657 A | 9/1998 | Williams et al. | | 6,016,954 A | 1/2000 | Abe et al. |
| 5,815,658 A | 9/1998 | Kuriyama | | 6,019,284 A | 2/2000 | Freeman et al. |
| 5,819,234 A | 10/1998 | Slavin et al. | | 6,026,370 A | 2/2000 | Jermyn |
| 5,819,237 A | 10/1998 | Garman | | 6,029,139 A | 2/2000 | Cunningham et al. |
| 5,832,457 A | 11/1998 | O'Brien | | 6,029,890 A | 2/2000 | Austin |
| 5,832,488 A | 11/1998 | Eberhardt | | 6,032,136 A | 2/2000 | Brake, Jr. et al. |
| 5,835,061 A | 11/1998 | Stewart | | 6,036,099 A | 3/2000 | Leighton |
| 5,835,576 A | 11/1998 | Katz | | 6,038,292 A | 3/2000 | Thomas |
| 5,839,113 A | 11/1998 | Federau et al. | | 6,038,552 A | 3/2000 | Fleischl et al. |
| 5,845,259 A | 12/1998 | West et al. | | 6,041,315 A | 3/2000 | Pollin |
| 5,845,260 A | 12/1998 | Nakano et al. | | 6,045,042 A | 4/2000 | Ohno |
| 5,852,811 A | 12/1998 | Atkins | | 6,047,067 A | 4/2000 | Rosen |
| 5,852,812 A | 12/1998 | Reeder | | 6,047,268 A | 4/2000 | Bartoli et al. |
| 5,857,079 A | 1/1999 | Claus et al. | | 6,047,270 A | 4/2000 | Joao |
| 5,857,175 A | 1/1999 | Day | | 6,049,463 A | 4/2000 | O'Malley et al. |
| 5,857,709 A | 1/1999 | Chock | | 6,049,773 A | 4/2000 | McCormack et al. |
| 5,859,419 A | 1/1999 | Wynn | | 6,049,782 A | 4/2000 | Gottesman et al. |
| 5,864,609 A | 1/1999 | Cross et al. | | 6,058,378 A | 5/2000 | Clark et al. |
| 5,864,828 A | 1/1999 | Atkins | | 6,064,985 A | 5/2000 | Anderson |
| 5,864,830 A | 1/1999 | Armetta et al. | | 6,065,675 A | 5/2000 | Teicher |
| RE36,116 E | 2/1999 | McCarthy | | 6,068,183 A | 5/2000 | Freeman et al. |
| 5,870,718 A | 2/1999 | Spector | | 6,070,067 A | 5/2000 | Nguyen et al. |
| 5,870,721 A | 2/1999 | Norris | | 6,070,147 A | 5/2000 | Harms et al. |
| 5,875,437 A | 2/1999 | Atkins | | 6,070,153 A | 5/2000 | Simpson |
| 5,883,377 A | 3/1999 | Chapin, Jr. | | 6,076,068 A | 6/2000 | DeLapa et al. |
| 5,883,810 A | 3/1999 | Franklin et al. | | 6,076,072 A | 6/2000 | Libman |
| 5,884,271 A | 3/1999 | Pitroda | | 6,078,888 A | 6/2000 | Johnson, Jr. |
| 5,884,278 A | 3/1999 | Powell | | 6,078,891 A | 6/2000 | Riordan et al. |
| 5,884,285 A | 3/1999 | Atkins | | 6,091,817 A | 7/2000 | Bertina et al. |
| 5,887,065 A | 3/1999 | Audebert | | 6,092,056 A | 7/2000 | Tull, Jr. et al. |
| 5,890,138 A | 3/1999 | Godin et al. | | 6,095,412 A | 8/2000 | Bertina et al. |
| 5,890,140 A | 3/1999 | Clark et al. | | 6,095,416 A | 8/2000 | Grant et al. |
| H1794 H | 4/1999 | Claus | | 6,098,053 A | 8/2000 | Slater |
| 5,897,620 A | 4/1999 | Walker et al. | | 6,105,011 A | 8/2000 | Morrison, Jr. |
| 5,905,246 A | 5/1999 | Fajkowski | | 6,105,865 A | 8/2000 | Hardesty |
| 5,911,135 A | 6/1999 | Atkins | | 6,115,458 A | 9/2000 | Taskett |
| 5,911,136 A | 6/1999 | Atkins | | 6,119,932 A | 9/2000 | Maloney et al. |
| 5,914,472 A | 6/1999 | Foladare et al. | | 6,122,623 A | 9/2000 | Garman |
| 5,920,629 A | 7/1999 | Rosen | | 6,128,598 A | 10/2000 | Walker et al. |
| 5,920,844 A | 7/1999 | Hotta et al. | | 6,128,599 A | 10/2000 | Walker et al. |
| 5,920,847 A | 7/1999 | Kolling et al. | | 6,129,274 A | 10/2000 | Suzuki |
| 5,923,734 A | 7/1999 | Taskett | | 6,134,536 A | 10/2000 | Shepherd |
| 5,926,800 A | 7/1999 | Baronowski et al. | | 6,138,917 A | 10/2000 | Chapin, Jr. |
| 5,930,217 A | 7/1999 | Kayanuma | | 6,145,741 A | 11/2000 | Wisdom et al. |
| 5,930,764 A * | 7/1999 | Melchione et al. .......... 705/7.29 | | 6,148,297 A | 11/2000 | Swor et al. |
| 5,931,764 A | 8/1999 | Freeman et al. | | 6,158,657 A * | 12/2000 | Hall et al. ..................... 235/380 |
| 5,933,817 A | 8/1999 | Hucal | | 6,161,096 A | 12/2000 | Bell |
| 5,937,068 A | 8/1999 | Audebert | | 6,163,770 A | 12/2000 | Gamble et al. |
| 5,940,811 A | 8/1999 | Norris | | 6,164,533 A | 12/2000 | Barton |
| 5,950,179 A * | 9/1999 | Buchanan et al. ............... 705/38 | | 6,167,385 A | 12/2000 | Hartley-Urquhart |
| 5,952,641 A | 9/1999 | Korshun | | 6,169,975 B1 | 1/2001 | White et al. |
| 5,953,423 A | 9/1999 | Rosen | | 6,173,267 B1 | 1/2001 | Cairns |
| 5,953,710 A | 9/1999 | Fleming | | 6,182,048 B1 | 1/2001 | Osborn et al. |
| 5,955,961 A | 9/1999 | Wallerstein | | 6,182,894 B1 | 2/2001 | Hackett et al. |
| 5,963,648 A | 10/1999 | Rosen | | 6,186,793 B1 | 2/2001 | Brubaker |
| 5,970,479 A | 10/1999 | Shepherd | | 6,189,787 B1 | 2/2001 | Dorf |
| 5,970,480 A | 10/1999 | Kalina | | 6,195,644 B1 | 2/2001 | Bowie |
| 5,974,399 A | 10/1999 | Giuliani et al. | | 6,202,053 B1 * | 3/2001 | Christiansen et al. .......... 705/38 |
| RE36,365 E | 11/1999 | Levine et al. | | 6,205,437 B1 | 3/2001 | Gifford |
| 5,984,180 A | 11/1999 | Albrecht | | RE37,122 E | 4/2001 | Levine et al. |
| 5,984,191 A | 11/1999 | Chapin, Jr. | | 6,227,447 B1 | 5/2001 | Campisano |
| 5,987,434 A | 11/1999 | Libman | | 6,243,688 B1 | 6/2001 | Kalina |
| 5,988,509 A | 11/1999 | Taskett | | 6,263,316 B1 | 7/2001 | Khan et al. |
| 5,991,413 A | 11/1999 | Arditti et al. | | 6,265,977 B1 | 7/2001 | Vega et al. |
| 5,991,743 A | 11/1999 | Irving et al. | | 6,278,981 B1 | 8/2001 | Dembo et al. |
| 5,991,748 A | 11/1999 | Taskett | | 6,295,522 B1 | 9/2001 | Boesch |
| 5,991,750 A | 11/1999 | Watson | | 6,298,336 B1 | 10/2001 | Davis et al. |
| 6,000,608 A | 12/1999 | Dorf | | 6,308,268 B1 | 10/2001 | Audebert |
| 6,000,832 A | 12/1999 | Franklin et al. | | 6,336,099 B1 | 1/2002 | Barnett et al. |
| 6,002,383 A | 12/1999 | Shimada | | 6,341,724 B2 | 1/2002 | Campisano |
| 6,003,762 A | 12/1999 | Hayashida | | 6,343,743 B1 | 2/2002 | Lamla |
| 6,004,681 A | 12/1999 | Epstein et al. | | 6,345,261 B1 | 2/2002 | Feidelson |
| 6,006,988 A | 12/1999 | Behrmann et al. | | 6,345,766 B1 | 2/2002 | Taskett et al. |

| | | |
|---|---|---|
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| 6,611,910 B2 | 8/2003 | Mittal et al. |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,693,544 B1 | 2/2004 | Hebbecker |
| 6,715,679 B1* | 4/2004 | Infosino ............... 235/449 |
| 6,742,704 B2 | 6/2004 | Fitzmaurice et al. |
| 6,745,938 B2 | 6/2004 | Sullivan |
| 6,802,008 B1 | 10/2004 | Ikefuji et al. |
| 6,805,287 B2 | 10/2004 | Bishop |
| 6,817,521 B1* | 11/2004 | Matada ............... 235/380 |
| 6,865,547 B1 | 3/2005 | Brake, Jr. et al. |
| 6,868,389 B1* | 3/2005 | Wilkins et al. .......... 705/10 |
| 6,868,426 B1 | 3/2005 | Mankoff |
| 6,876,971 B1 | 4/2005 | Burke |
| 6,901,372 B1 | 5/2005 | Helzerman |
| 7,006,992 B1 | 2/2006 | Packwood |
| 7,103,573 B2* | 9/2006 | Mobed et al. ........... 705/56 |
| 7,104,443 B1 | 9/2006 | Paul et al. |
| 7,305,364 B2* | 12/2007 | Nabe et al. ............. 705/37 |
| 7,318,049 B2 | 1/2008 | Iannacci |
| 7,392,224 B1 | 6/2008 | Bauer et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0062241 A1* | 5/2002 | Rubio et al. ............. 705/10 |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0111915 A1 | 8/2002 | Clemens |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0123965 A1 | 9/2002 | Phillips |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2002/0194050 A1* | 12/2002 | Nabe et al. ............ 705/10 |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0088462 A1 | 5/2003 | Carrithers |
| 2003/0097331 A1 | 5/2003 | Cohen |
| 2003/0101119 A1 | 5/2003 | Parsons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0103065 A1* | 5/2004 | Kishen et al. ........... 705/64 |
| 2004/0117501 A1* | 6/2004 | Jones et al. ............ 705/39 |
| 2004/0122736 A1* | 6/2004 | Strock et al. ........... 705/14 |
| 2004/0193539 A1* | 9/2004 | Sullivan ............... 705/39 |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0091138 A1 | 4/2005 | Awatsu |
| 2005/0171898 A1 | 8/2005 | Bishop et al. |
| 2006/0081702 A1* | 4/2006 | Nandakumar ......... 235/380 |
| 2008/0052225 A1* | 2/2008 | Walker et al. .......... 705/38 |

FOREIGN PATENT DOCUMENTS

| | | |
|---|---|---|
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/69347 | 9/2001 |
| WO | WO 2005/043277 A2 | 5/2005 |

OTHER PUBLICATIONS

BankersOnline.com: Commentary; Supplement I to Part 205—Official Staff Interpretations: Jan. 31, 2002, www.bankersonline.com/regs/205/regecomm.txt , pp. 1-35.*

Lamiell P.: Visa changes Debit Card policy, Associated Press, Daily News, Aug. 14, 1997, p. B.3.*

Richards, B: Beware the arrival of unsolicited debit cards, Madison Capital Times, Madison, Wis: Oct. 28, 2000, p. 1.E.*

Tim Huber, The check is in the mail, like it or not, Minneapolis/St. Paul City Business, Minneapolis: Jan. 18, 1997, vol. 14, Iss. 33.

WikiAnswers, How do commercial banks make profit, 1999 http://wiki.answers.com/Q/How_do_commercial_banks_make_profit.

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks for ID, Time Magazine, Apr. 12, 2004, 1 page.

A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=1 0639, Jul. 12, 2005, 2 pages.
Visa releases visa cash electronic purse specifications based on CEPS, www.visa.com/av/news/PRaamisc042099.vhtml, San Francisco, Apr. 20, 1999.
Konrad, IBM Had a Bunch of Unusual Ideas in 2003, www.philly.com, printed Jan. 21, 2004, posted on Jan. 13, 2004, 2 pages.
Hansell, Visa to unveil electronic purse cards, New York Times, printed Feb. 23, 2001, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number For All Calls, AT&T Marketing, News Release, www.att.com/press/0297/970217.csa.htm, Feb. 17, 1997, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quartly, v82, n3, p. 1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Card Based Award Systems, JA8309, Nov. 1, 1995.

* cited by examiner

Alternative customer touch points for activating bank card

Linkage of Credit Card And Bank Card

METHOD AND SYSTEM FOR DISTRIBUTION OF UNACTIVATED BANK ACCOUNT CARDS

FIELD OF THE INVENTION

The present invention generally relates generally to bank cards, such as debit cards, checking cards and ATM cards, and more particularly, to an inactive or dead bank card distributed in unsolicited fashion to potential customers.

BACKGROUND OF THE INVENTION

As we move from a paper-based to a non paper-based economy, consumers now have a myriad of card-based options for purchasing goods and services and for accessing their financial accounts. There are conventional credit cards (general revolving credit accounts); co-branded credit cards (revolving credit accounts issued in the name of the issuing bank and a partner, such as a university, airlines, computer manufacturer, and so forth, often including incentives or rebates usable for partner discounts or rewards); private label cards (revolving credit accounts issued in the name of a private company and typically usable only at that company's stores, such as a Macy's or Hecht's card); stored value or gift cards (prefunded cards storing cash value, such as a Giant card or Starbuck's card, that must periodically be replenished); ATM cards (allow access to the accountholder's bank account by inserting the card into an ATM and entering a PIN number); and debit cards/check cards (allow access to the accountholder's savings/checking account to pay for goods/services at a point-of-sale [POS] device).

Debit cards/check cards generally fall into two categories, so-called "on-line" or PIN-based debit/check cards and so-called "off-line" or signature-based debit/check cards. PIN-based cards require entry of a correct PIN to consummate a purchase, and the transaction is typically run through a regional electronic funds transfer (EFT) network to approve the transaction and, later, settle the funds transfer. Examples of well-known existing EFT networks are STAR, NYCE, and Pulse. Signature-based cards are typically issued with a VISA/Mastercard (or other) card association logo/hologram, and transactions using such cards are run through the associated card network. Signature-based cards typically, although not always, will verify cardholder identity by checking the signature of the person presenting the card. Because the fees associated with running transactions through a national network like VISA/Mastercard are higher than those associated with regional EFT networks, some cards have both capabilities, and a merchant's POS system may provide for first attempting to run the transaction through the regional EFT before accessing a national network.

As described herein, ATM cards, debit cards, check cards, and stored value cards can be collectively referred to as "bank cards."

For a number of reasons, consumers tend to be much less willing to switch their bank accounts (or open new ones in addition to their existing bank accounts) than their credit accounts. Thus, while credit card issuers find an active market of consumers ready to switch their credit accounts and/or open up new credit accounts, savings/checking account issuing banks are finding it increasingly hard to sign up new bank account holders so as to maintain or increase the customer base.

What is needed is a system and method that makes it easier and more attractive to consumers to open new bank accounts.

SUMMARY OF THE INVENTION

An embodiment of the present invention comprises a method for distributing unsolicited bank cards to potential customers including identifying a pool of potential new bank account holders; determining if a person from the pool is an existing bank account holder; determining if the person is eligible to become a bank account holder if not presently a bank account holder; creating a dead bank card including embossed information and magnetic stripe information; and distributing the dead bank card to that person. The dead card is a bank card (e.g., an ATM card, checking card, debit card, or stored value card) not yet active, but which reflects and identifies a bank account (e.g., checking account, savings account, loan account, stored value account, or sponsor-funded stored value account) that will be activated upon customer acceptance of the offer for a new bank account.

According to a further aspect of the invention, evaluation of the potential new bank account holder may include determining whether the potential customer was the holder of a bank account that was previously closed with that bank. For such potential customers, the identification of a previously-closed account may affect whether the bank decides to distribute the dead bank card in the first place and/or whether that person receives a special incentive to induce him/her to resume banking with that bank.

According to a further aspect of the invention, the bank may "prebuild" the bank account associated with the dead bank card so that customer acceptance of the offer can result in relatively immediate activation of the account.

According to another embodiment of the invention, the distribution of the dead bank cards is undertaken in conjunction with distribution of live credit cards issued by the same bank. A customer application for a credit card is received and processed to determine an underwriting decision on the credit card. The customer is also evaluated to determine if he/she is an existing bank account customer of the bank. If the customer is an existing bank account customer, a live credit card is distributed to approved credit card applicants. If not an existing bank account customer, both a dead bank card and the live credit card are distributed to approved credit card applicants.

According to a further aspect of the invention, customers receiving a dead bank card and a live credit card may be incentivized to accept the offer for a new bank account through linkage between the credit card and the bank card through a rewards/rebate program.

According to another embodiment of the invention, the unsolicited dead bank card is a universal bank card that can be linked by a person to an existing bank account, including a bank account provided by a bank other than the bank distributing the universal bank card. The universal bank card includes embossed information and magnetic stripe information, including a universal account number that will be linked to an underlying, preexisting bank account.

Accordingly, it is one object of the present invention to overcome one or more of the aforementioned and other limitations of existing systems and methods for attracting new bank account customers.

It is another object of the invention to facilitate new bank account customers by providing a dead bank card that is inactive but otherwise fully reflects and represents a bank account associated with that card once the customer accepts the offer.

It is yet another object of the invention to facilitate new bank account customers by co-marketing unsolicited dead bank cards along with solicited credit cards for which a customer has submitted an application.

It is yet another object of the invention to facilitate new bank account customers by co-marketing unsolicited dead bank cards along with solicited credit cards by providing rebate/rewards program linkage between the bank card account and credit card account.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

This application is related by subject matter to Brake, et al, U.S. Pat. No. 6,032,136, entitled "Customer Activated Multi-Value (CAM) Card," herein incorporated by reference in its entirety.

Figure 1:
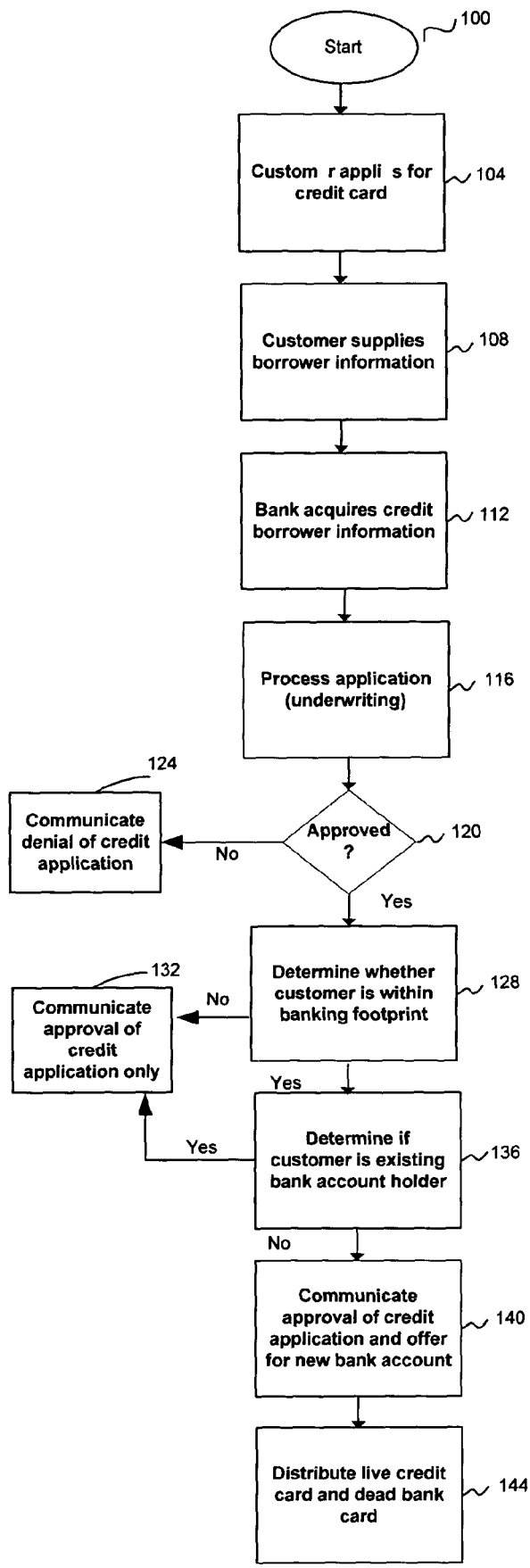
FIG. 1 is a flow diagram of a method for distributing dead bank cards and live credit cards to credit card applicants according to an embodiment of the invention.

FIG. 1 illustrates a method for distributing dead bank cards and live credit cards to credit card applicants according to an embodiment of the invention. As referred to herein, "bank cards" refers to cards providing a consumer access to a bank account, thereby encompassing so-called ATM cards, debit cards, checking cards, stored value cards, and the like, which provide access to funds in a savings and/or checking type and/or other type bank account. The bank account could be a checking account, savings account, loan account, stored value account, sponsor-funded stored value account, and the like.

As referred to herein, "dead" bank cards refer to bank cards which are physically identical to a live bank card (i.e., are embossed or otherwise inscribed with the account holder's name, account number, and the like, and which include the appropriate magnetic stripe data), but which reflect a bank account that is not yet activated because the customer has not accepted the bank's offer for a new bank account. Therefore, such a bank card is in essence a dead card because the customer did not made an application, and at the time the bank card is distributed the customer has not yet responded positively (customer's acceptance) to the unsolicited overture (bank's offer). The dead bank card is capable of full functionality upon activation because it is distributed to the customer with all necessary information, including a bank account number assigned to that prospective customer before the card is sent.

It should be understood that while a number of actions disclosed herein are (for purposes of clarity) characterized as being carried out by the bank, those of ordinary skill in the art will appreciate that these actions can easily be carried out by the bank's agents, partners, contractors and the like, without departing from the spirit and scope of the present invention.

The method of FIG. 1 starts at 100 and proceeds to 104 where the customer applies for a credit card. The application may be a written application sent through the mail or dropped off in a bank branch office, a store, or any other depository for credit card applications. The application may be a completed application GUI form submitted through the Internet or an electronic application submitted via electronic mail. The application may be communicated verbally through a phone call with a human customer service representative (CSR) or an automated interactive voice response (IVR) unit. The credit card application may have been instigated by the bank through a marketing overture (print, direct marketing phone call, Internet, e-mail, and so forth), or the application may have been initiated by the customer. The credit card application may have been instigated by a co-branded partner of the bank.

As reflected at 108, the customer typically will supply basic borrower information, such as name, social security number, address, phone numbers, income/asset/debt information, and the like. At a minimum, the customer should supply or confirm basic borrower information sufficient for the bank to access a credit report(s) for the customer, as reflected at 112. At 116, the credit card application is processed to provide an underwriting result, which may be an approval or a denial, as reflected at step 120. According to one implementation (not shown), a third interim result of "approval pending" may result if the applicant is borderline and/or further information is required before an approval or denial can be issued.

If the applicant is finally denied ("No" at 120), a denial result is communicated (e.g., by mail, phone, email, the Internet, etc.) to the applicant at 124.

If the applicant is approved for the credit card account, at step 128 it is optionally determined whether the customer is within the banking footprint, i.e., the area in which the bank offering the credit card also offers banking (checking/savings) services. This beneficial step ensures, for example, that a bank providing banking services only in California and New York will not be sending unsolicited dead bank cards to credit applicants residing in Alaska. Step 128 can be implemented such that the applicant must reside within the banking footprint (e.g., within California or New York in the example given) or must reside in a location proximate to the banking footprint (e.g., within California or New York or within 50 miles of either state).

Step 128 is optional to the invention. In some cases, for example, if the bank is a national bank and/or if the bank offers nationwide banking services via the Internet, step 128 need not be implemented.

If the credit applicant is not within the banking footprint ("No" at 128), the bank communicates only the approval of the credit application to the applicant, at 132, and only the live credit card will be sent to the applicant. Live credit card refers to a credit card for a credit account for which an application has been submitted and fully processed (i.e., an offer has been made by the applicant and the bank has accepted the offer). The card is either fully active, meaning that it can be used immediately, or simply requires a confirmatory call (i.e., phone call to an IVR or CSR, Internet access, email confirmation, regular mail confirmation, etc.) to activate the card.

If the credit applicant is determined to be within the banking footprint ("Yes" at 128), the customer is next evaluated to determine if he/she is an existing bank account holder with the issuing bank at 136. If the credit applicant is already an existing bank account holder ("Yes" at 136), the bank communicates only the credit card approval and sends only the live credit card to the customer, as described above.

If the credit applicant is not an existing bank account holder ("No" at 136), the bank communicates approval of the credit application, as well as an offer for a new bank account to the credit card applicant, at 140. At 144, the live credit card and the dead bank card are distributed to the customer. It should be noted that steps 140 and 144 can be performed through two communications (e.g., a first letter informing the customer of approval for the credit card and an offer for a new bank account, and a second letter with the live credit card and dead bank card) or a single communication (combining both of the aforementioned).

It should also be noted that, while not depicted FIG. 1, prior to the communication of the offer for the bank account (step 140 and/or 144), the bank may prebuild the new bank account, discussed further below for FIG. 2.

The steps disclosed in FIG. 1 (and the figures that follow) can be carried out by conventional hardware and software, such as application processing servers operated by the bank or its agents, web servers, and the like. Customers can interact with the bank via any personal computing or communications device (e.g., personal computer, PDA, web-enabled wireless device, home phone, cell phone, and the like), via paper mail, and via a phonecall to a CSR or IVR.

Figure 2:
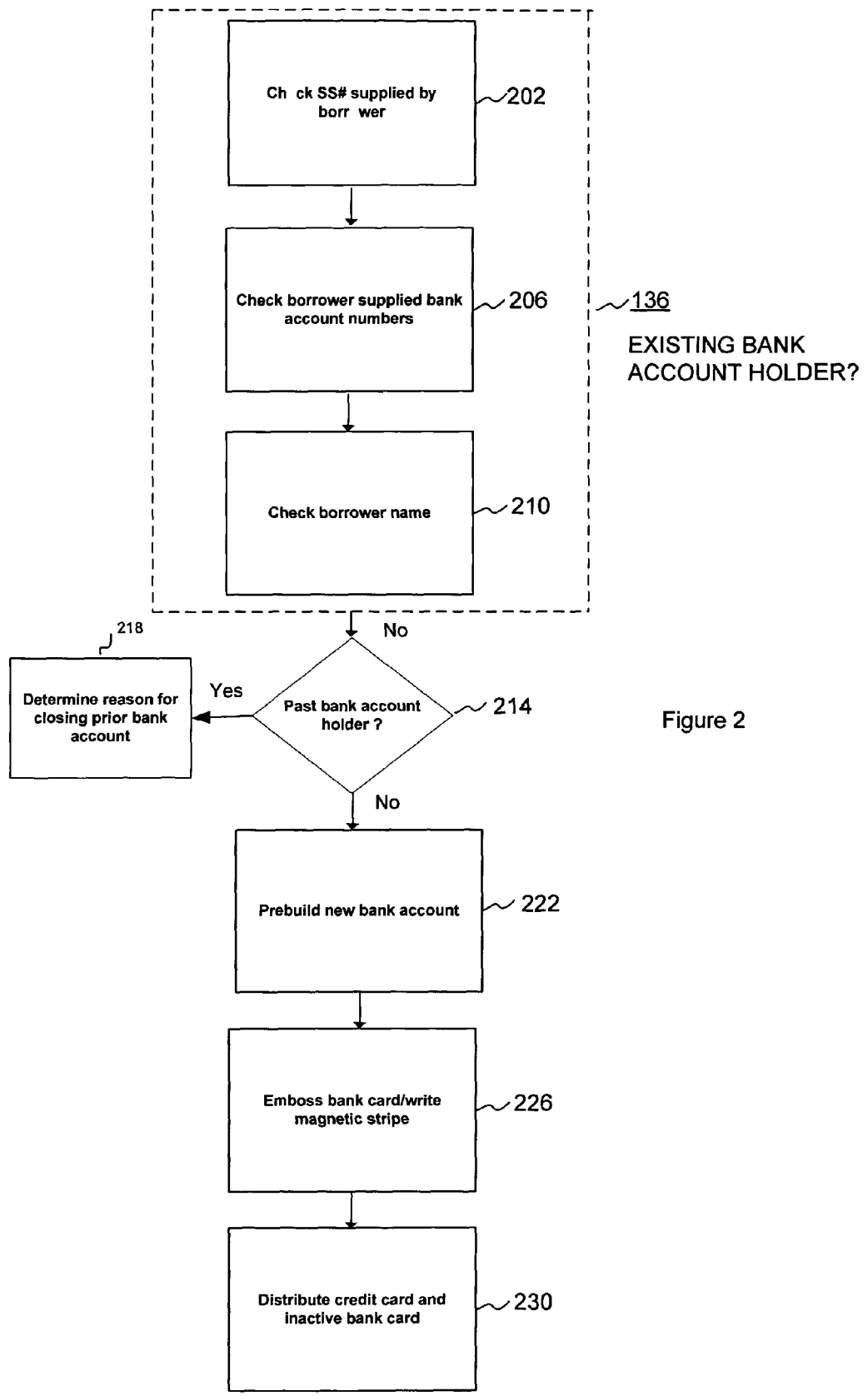
FIG. 2 is a flow diagram of a method for evaluating potential recipients of dead bank cards and live credit cards to applicants for credit card accounts according to an embodiment of the invention.

FIG. 2 is a flow diagram of a method for evaluating potential recipients of dead bank cards based on applications for credit card accounts according to an embodiment of the invention. Step 136 of FIG. 2 (which may correspond to step 136 of FIG. 1) provides for determining whether the credit applicant is an existing bank account holder, and may include one or more steps such as checking the social security number provided by the credit applicant at 202, checking borrower-supplied bank account numbers provided by the credit applicant at 206, and/or checking the borrower name at 210. Other steps for determining whether the credit applicant is an existing bank account holder could readily be added or substituted.

At 214, it is determined if the credit applicant is a past bank account holder. This determination can be useful in two regards. First, the bank may wish to evaluate the reason the prior bank account was closed. For example, if the account was closed because the customer was continually bouncing checks or otherwise attempting to overdraw an account, or for other reasons indicating that the person was a poor customer, the bank may not wish to solicit that customer for a new bank account. In addition, or alternatively, the bank may wish to know whether the person is a prior bank account holder so that the dead bank card overture can be handled differently. For example, the overture communication to that person might reference the person's status as a prior bank account holder ("We noted that you were a past bank account holder with us. We really want you back!") and/or might include the offer of an incentive for the person to reestablish a bank account with the bank ("If you reopen a bank account with us we are prepared to make an initial $50 deposit into your account!" or "If you reopen a bank account with us we are prepared to credit your frequent flyer account with 10,000 free miles!"). (Of course, incentives like the aforementioned can be offered to persons who are not prior bank account holders, as well.)

If there was a prior bank account ("Yes" at 214), the reason for closure of the prior account is determined at 218, which may include a review of the records from the closed account. If there was no prior bank account ("No" at 214) the method proceeds to 222.

At 222, the bank may "prebuild" the new bank account, meaning that some or all of the records at the bank may be set up in anticipation of the customer deciding to open the new account corresponding to the dead bank card. Thus, the bank may establish the new account number for the bank and prepopulate such data fields as the customer's name, social security number, and so forth. According to one embodiment, the bank may prebuild the new bank account to the point where it is fully ready for activation without any or substantial further data entry. The beneficial feature of 222 is in harmony with one of the goals of providing the customer a dead bank card, which is to essentially make an offer for a new bank account that is "ready to go." Thus, the customer has a physical bank card ready for use, the bank has already set up the records for the new account, and so forth.

At step 226, the dead bank card is prepared. For conventional cards having an embossing section on the front and magnetic stripe section on the bank, step 226 provides for embossing the front and writing (e.g., by magnetic encoding or otherwise as appropriate to the stripe) to the stripe on the back. Preferably, the card contains everything needed to be functional. The prospective bank account holder will not have to bring the card to a branch or other location to have it read, written, embossed, or otherwise modified. The dead bank card is ready for use once the account records at the bank are activated. Those of ordinary skill in the art will appreciate that step 226 can be carried out for variations of conventional cards, such as a card having an electronic memory instead of a magnetic stripe, a card employing writing techniques other than embossing, and so forth. So-called "smart cards" should be considered within the spirit and scope of the present invention.

At step 230, the live credit card and dead bank card are distributed to the customer. As discussed in FIG. 1, step 230 can be carried out using a single or multiple communications.

There is a further embodiment that can be implemented as a variation or enhancement to the method of distributing dead bank cards and live credit cards depicted in FIG. 1. According to this embodiment, the method provides for the distribution of upgraded bank cards to existing holders of "standard" (i.e., non-upgraded) bank cards. Referring to FIG. 1, at step 136 the method provides for determining if the credit card applicant is an existing bank account holder. According to this further embodiment, if the credit card applicant is an existing bank account holder ("Yes" at 136), the method further provides for determining if the credit card applicant has a standard bank card, as opposed to an upgraded bank card that comprises the dead card in this variation. For example, the upgraded card may be a bank card providing a rewards/rebate feature not provided for by the standard card. The upgraded card may be a co-branded card or provide some other feature or functionality that renders it an upgrade as compared to the standard bank card presently held by the individual. If it is determined that the credit card applicant has only the standard card, then at steps 140 and 144 the method provides for communicating an offer for the upgraded bank account card and distribution of the upgraded bank account card. The recipient of such an upgraded bank account card comprising the dead card will activate the card as otherwise described herein.

Figure 3:
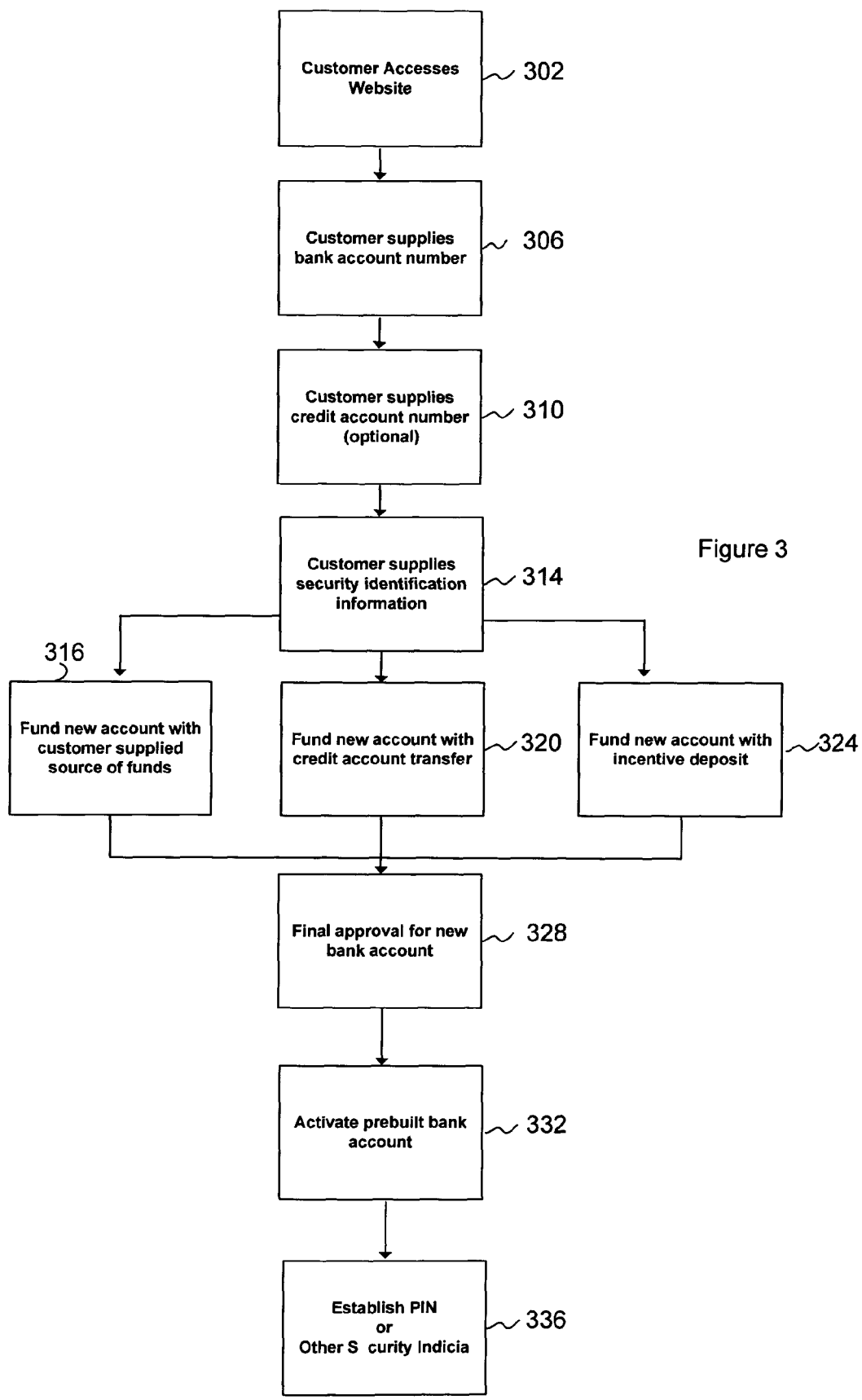
FIG. 3 is a flow diagram of a method for a customer to activate a dead bank card distributed in accordance with the present invention.

FIG. 3 is a flow diagram of a method for a customer to activate a dead bank card distributed in accordance with the present invention. In essence, FIG. 3 reflects the consumer's acceptance of the unsolicited offer provided by the bank for the dead bank card, and the bank's activation of the associated bank account number. At 302, the customer accesses a website, and at 306 the customer supplies the bank account number contained on the dead bank card. Optionally, for security purposes and/or for tracking effectiveness of the campaign, the customer may be requested to supply the credit card number at 310 for the live credit card that was distributed with the dead debit card.

At 314, the customer may be requested to provide further information for security purposes. This information may include a social security number, mother's maiden name, phone number, and/or other data items.

At 316-324, the customer may fund the account using one or more of several sources. At 316, the customer may fund the account with a customer-supplied source of funds, such as a preexisting credit card with the bank or with another bank, a bank card for an existing account with another bank, a check for an existing account with another bank, an EFT for another account, a wire transfer, or any other suitable means. At 320, the customer may fund the account with funds to be provided from the new credit account that the customer applied for. At 324, the customer may fund the account with an incentive deposit provided by the bank. For example, the dead card offering bank may offer to seed the account with an initial $50 deposit.

At 328, final approval for the new bank account is established, and at 332 the new account is activated. If the account was prebuilt, in essence no more is required. If the account was not prebuilt or was only partially prebuilt, the customer may be required to supply, and the bank may be required to enter, additional information prior to activation.

If the dead debit card is a PIN-type on-line card, or a combination signature-type/PIN-type card, the bank may provide, or the customer may request and the bank may confirm, a PIN number, password, or other security indicia at 336.

Figure 4:
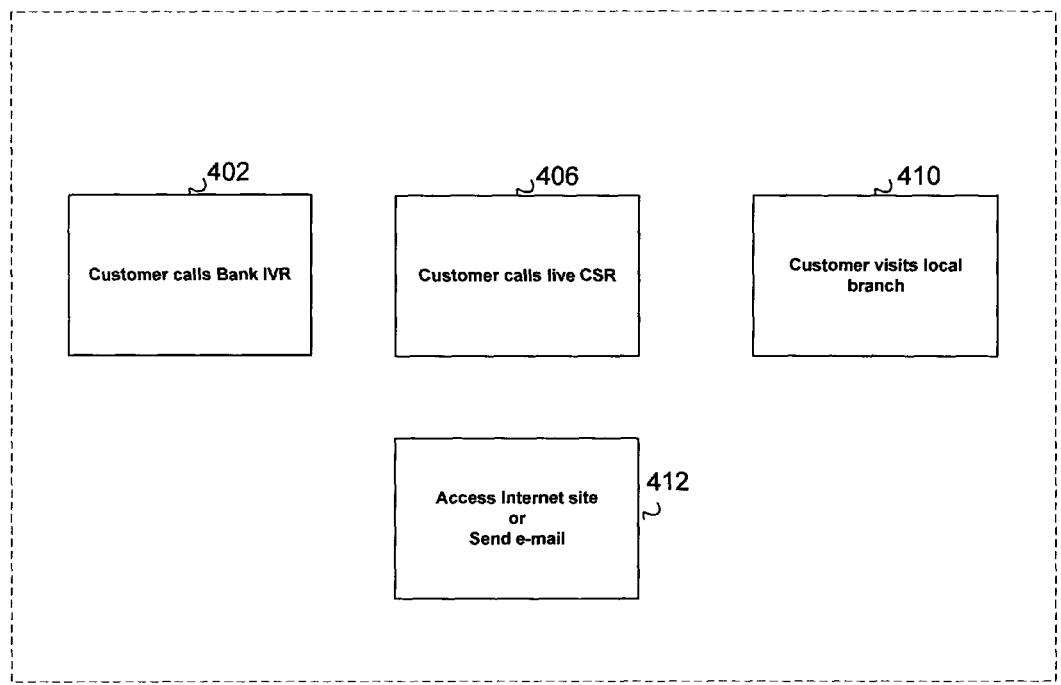
FIG. 4 is a block diagram illustrating various consumer touchpoints for activating a dead bank card distributed in accordance with the present invention.

FIG. 4 is a block diagram illustrating various consumer touchpoints for activating a dead bank card distributed in accordance with the present invention. FIG. 4 may correspond to 302 of FIG. 3. Therefore, the customer touchpoint for activating the dead bank card may occur via a call-in to an IVR 402, a call-in to a CSR at 406, a visit to a local branch or other physical location 410, or accessing an Internet site/sending an email 412. The customer could even initiate his/her acceptance via regular mail (not shown). Other touchpoints for the customer to activate the dead bank card could easily be employed without departing from the spirit and scope of the present invention.

Figure 5:
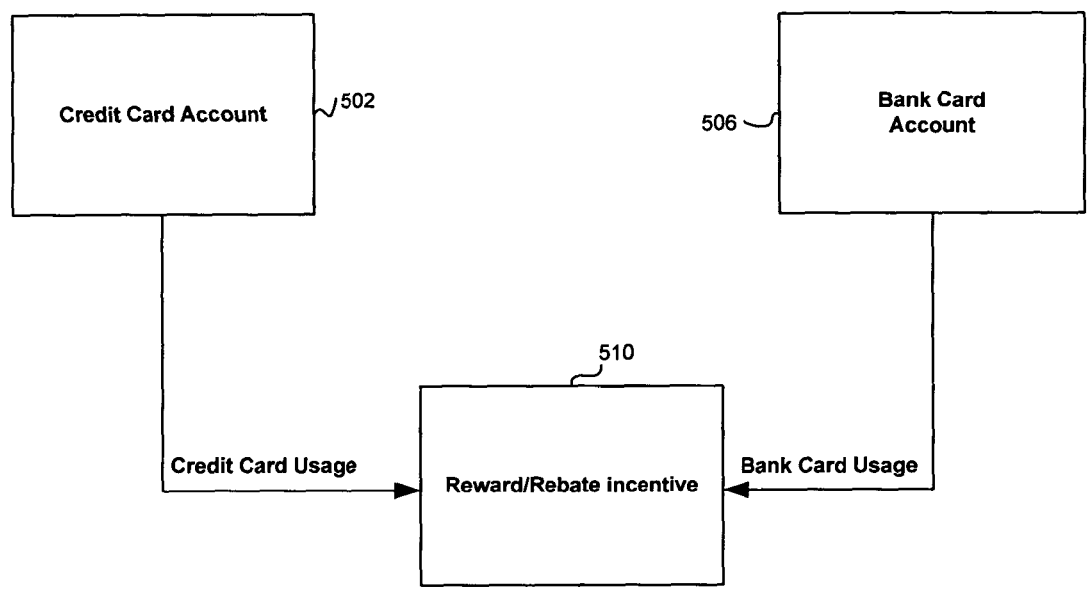
FIG. 5 is a block diagram illustrating the linkage of a credit card account and a bank account through a rewards/rebate program according to an embodiment of the invention.

FIG. 5 is a block diagram illustrating the linkage of a credit card account and a bank account through a rewards/rebate program according to an embodiment of the invention. Accordingly, credit card account 502 is the account associated with the live credit card distributed to the customer, and bank card account 506 is the account associated with the dead bank card (which could be a dead card for new bank account or a dead card for an upgraded bank card, as discussed for FIG. 1). According to one embodiment of the invention, the accounts are beneficially linked together through a rebate/rewards incentive 510. Thus, credit card usage may result in rebate/rewards, just as bank card usage may result in rebate/rewards. The level or rate of rebate/rewards may differ. For example, the incentive provided for credit card usage may be higher than for bank card usage because the revenue generated for the bank is higher for credit card usage. Although FIG. 5 depicts rebate/rewards based on card usage, in addition or instead, the rebate/rewards could be based on opening the account in the first place. Thus, as previously described, the customer applying for the credit card with a rebate/rewards feature might be encouraged to open the bank account by offering a further rebate/reward deposit based on activation of the dead bank card.

As referred to herein, rebate/rewards refers to any bank program for encouraging use of a card and/or maintenance of a card account by providing something of value to the accountholder, such as funds based on usage, funds based on longevity of the account, redeemable points or their equivalent (e.g., frequent flyer miles) based on usage and/or longevity, and the like. Such rebate/rewards can be provided by the bank for a bank branded card (i.e., no co-branded partner), by the bank for a co-branded card (e.g., frequent flyer miles for a Bank-Airlines co-branded card, car miles for a Bank-Rental Car Company co-branded card, hotel points for a Bank-Hotel co-branded card, shopping points/credits for a Bank-Supermarket co-branded card, and so forth), or as shared by the bank and a partner for a co-branded card. Of course, the co-brand partner could fund or underwrite the rebate/rewards in their entirety.

Additionally, the incentive levels or values can be varied according to the nature of the potential new bank account holder. For example, a first incentive can be provided to a customer who is not an existing bank account holder and who is not a past bank account holder, and a second incentive can be provided to a customer who is not an existing bank account holder and who is a past bank account holder, thereby providing different incentives to entirely new bank account customers and those who are past bank account customers.

Figure 6:
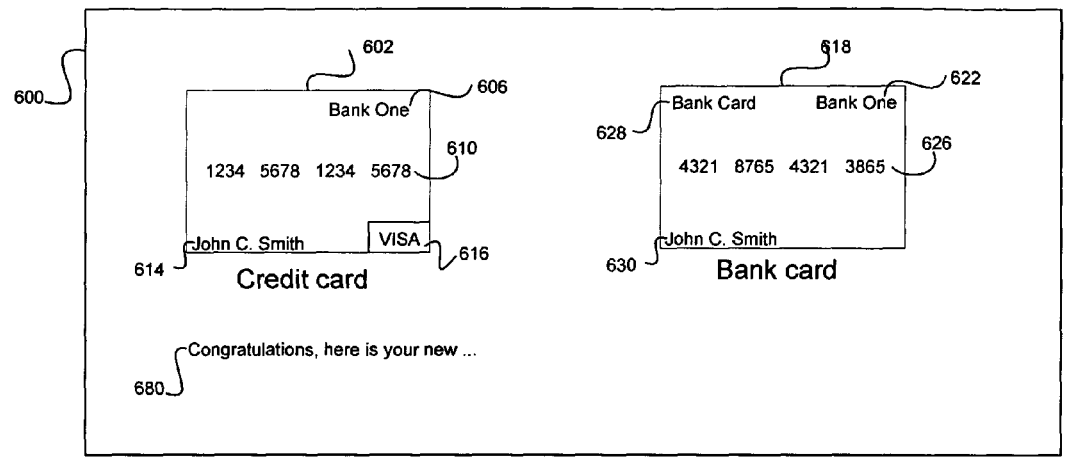
FIG. 6 illustrates a sample mail communication providing a dead bank card and a live credit card to a credit card applicant according to an embodiment of the invention.

FIG. 6 illustrates a sample mail communication providing a dead bank card and a live credit card to a credit card applicant according to an embodiment of the invention. Communication 600 is preferably a written communication, such as a letter with the cards, which may include text 680 announcing the approval of the requested live credit card as well as the solicitation of the customer to open a bank account associated with the dead bank card. Included with communication 600 is live credit card 602 and dead bank card 618.

Live credit card 602 may be a Bank brand card having a bank name indicia 606, credit account number 610, credit card account holder name 614, and interchange identifier/hologram 616. Credit card 602 is a live card that the individual has applied for and is a fully approved account in that all that is required is activation (e.g., a call to an 800# from the customer's home phone, email, regular mail, CSR, IVR, etc.); alternatively, credit card 602 may be a live card ready for use without further activation.

Dead bank card 618 may be a Bank brand card having bank name indicia 622, a bank card name 628 (e.g., Bank One Debit Card), bank card account number 626, and (prospective) bank card account holder name 630. Bank card 618 is a dead card that the individual has not applied for/requested and that physically contains all necessary information to be operative. It requires the customer to approve the new account (accept the offer) for the bank account to be officially opened. Preferably, dead bank card 618 is a card for an account that was not solicited by the customer or instigated by the customer. Rather, the dead bank card 618 relates to a separate card/account proposed by the bank as a result of the customer's application for a credit account. Alternatively, as discussed previously, the dead bank card 618 may relate to an upgraded bank card providing additional features beyond the standard card presently held by the individual.

Figure 7:
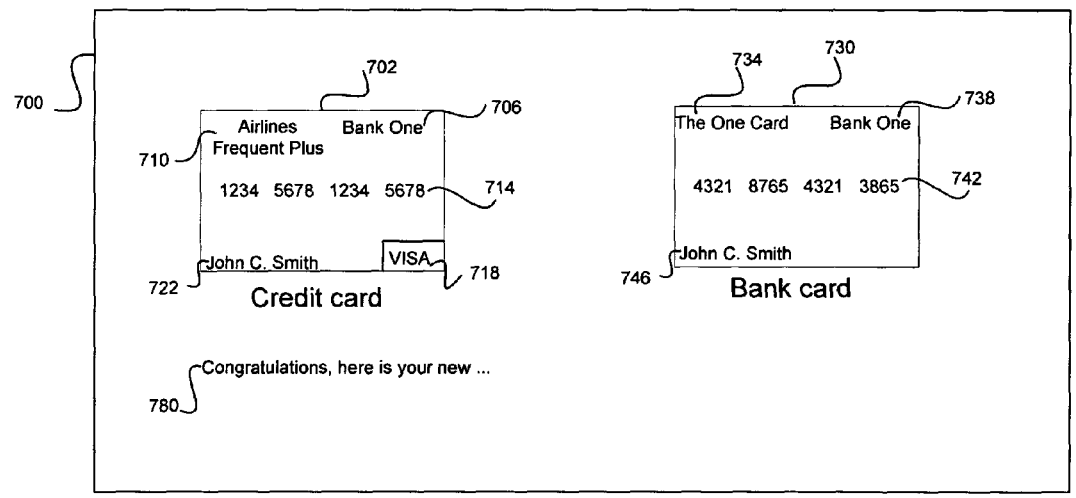
FIG. 7 illustrates a sample mail communication providing a dead bank card and a live co-branded credit card to a credit card applicant according to another embodiment of the invention.

FIG. 7 illustrates a sample mail communication providing a dead bank card and a live co-branded credit card to a credit card applicant according to another embodiment of the invention. FIG. 7 is similar to FIG. 6 except that FIG. 7 provides a co-branded credit card 702 to the customer. The co-branded live credit card 702 may include interchange logo/hologram 718, holder name 722, and credit account number 714, and bank name 706. In addition, card 702 includes a co-brand partner name/ID 710. The partner 710 may reflect a marketing partner or affiliation partner that may or may not include a rebate/rewards program.

The dead debit card 730 is similar to card 618 of FIG. 7, and includes (prospective) account holder name 746, bank account number 742, and bank name 738. Additionally, the card 730 may include a bank account card name 734. In addition, while not depicted in FIG. 7, card 730 may include a co-brand partner name/ID similar to that for card 702.

Figure 8:
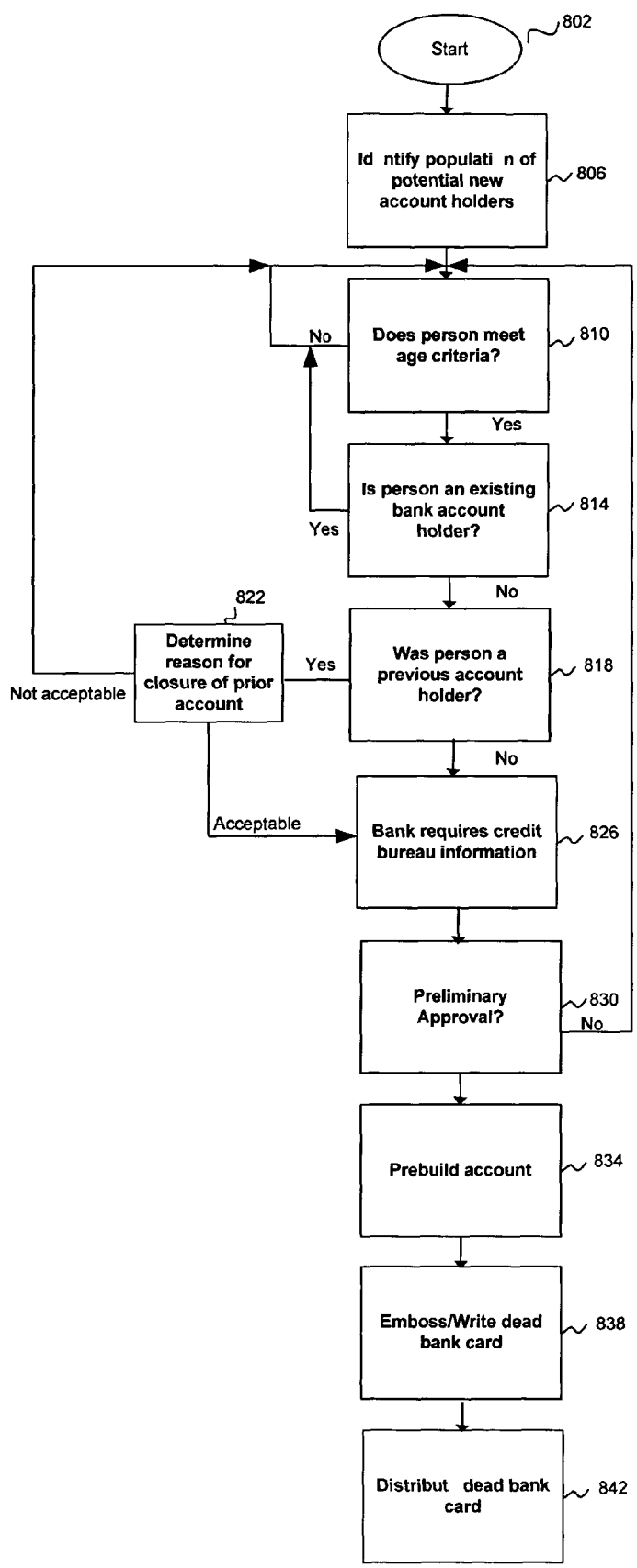
FIG. 8 is a flow diagram of a method according to another embodiment of the invention for distributing dead bank cards to potential bank account holders.

FIG. 8 is a flow diagram of a method according to another embodiment of the invention for distributing dead bank cards to potential bank account holders. FIG. 8 relates to a method for distributing dead bank cards that is not necessarily undertaken with respect to customers applying for credit cards (although it might).

Therefore, the population of potential new bank card account holders may be identified in a fashion other than by examining credit card applicants. For example, rather than using credit card applications as the "trigger" for distributing dead bank cards, other trigger events could be employed. In particular, so-called "life event" triggers could be employed, such as one or more of the following: new movers (individuals who have just moved to a new address); marriage/divorce (individuals recently becoming married or divorced); death (death of a spouse or partner); birth (new child); new phones (opening of new phone accounts); and so forth.

Another trigger for identifying potential recipients of dead bank cards could be based on so-called "recency" consumers. It is a well-known phenomenon in the financial services industry that individuals who have recently opened up a new account or renewed an existing account are more likely to be receptive to an overture for another account or other financial product. Therefore, a trigger for identifying a pool of potential bank account holders could be based on consumers who have recently opened up a new credit card account, who have recently renewed their credit card account through a reissued card, or who have recently opened up or renewed some other type of financial services account. By way of example only, as discussed below for FIG. 8, the population of potential new bank account holders may be identified based on consumers who have opened up new credit accounts within three months and/or who have renewed their credit accounts through reissue cards within three months.

Even more simply, the pool of potential new bank account holders could be identified based on existing credit card account holders (i.e., the pool is not limited to those who have recently opened up a new credit account or who have recently renewed their credit account through reissue).

Turning now to FIG. 8, after starting at 802, a population of potential bank account holders is identified at 806. This population could be identified based on one or more of the following factors: persons applying for a new credit card; persons within a banking footprint; persons undergoing one or more life events as described above; persons who recently opened up a credit account and/or renewed a credit account; and/or persons who are existing credit account holders.

Next, a person from the population may be checked so see whether he/she is of a certain age or within a certain age group at 810. For example, it may be a regulatory requirement or a policy not to make unsolicited bank account offers to persons under 18. Alternatively, or in addition, it may be desirable to target the campaign to persons in the age range of 25-45. If the person does not meet the age criteria ("No" at 810), the method proceeds to examine the next person from the population by returning to the input of 810.

If the person meets the age criteria ("Yes" at 810), the person is then examined to determine whether he/she is an existing bank account holder at 814. If the person is an existing bank account holder ("Yes" at 814), the method proceeds to examine the next person from the age population by returning to the input of 810.

If the person is not an existing bank account holder ("No" at 814), the method proceeds to 818 to determine whether the person was a previous bank account holder. If the person was a previous bank account holder ("Yes" at 818), the reason for the closure of the prior account is determined/evaluated at 822. If the reason is not acceptable at 822, the method returns to the next person at the input of 810.

Although not depicted in FIG. 8, steps 814 and 818 may provide in addition or instead for determining (as appropriate for the triggering for identifying the pool) whether the person is an existing or was a past credit card account holder with the bank, and for evaluating the person's payment history in connection with that account.

If the reason is acceptable at 822, the method proceeds to 826. If determined that the person is not a previous bank account holder ("No" at 818), the method proceeds to 826.

At 826, the bank may acquire credit bureau information on the person. If regulatory restrictions prohibit such unsolicited credit checks, this step may be skipped and undertaken when the prospective bank account customer responds to the dead bank card overture.

At 830, it is determined whether the person is preliminarily approved or eligible for a bank account. If not ("No" at 830), the next person is evaluated as the method returns to the input at 810. If approved/eligible ("Yes" at 830), the bank may prebuild the bank account at 834, as previously described.

Next, at 838 the bank may generate (e.g., emboss and write) the dead bank card. At 842, the dead bank card is distributed to the prospective bank account holder.

As described in conjunction with previous figures, the dead bank card of FIG. 8 may be a bank brand card or a co-branded card. The dead bank card of FIG. 8 may include a rebate/rewards feature for opening the account, using the account, and/or maintaining the account (longevity). The rebate/rewards feature may provide funds or points (or their equivalent) that are funded by the bank, a co-brand partner, and/or both.

According to yet another variation of the dead card invention, the offering bank could distribute dead cards in the form of inactive universal bank cards (referred to herein as a "Universal Bank Card") that are not yet associated with an underlying bank account number. Rather, these cards can be associated with an existing bank account number of the customer, including a bank account number for a bank other than the bank distributing the Universal Bank Card (hereinafter, the "offering bank" or "sponsoring bank"). The Universal Bank Card could be offered with an incentive program such that usage of the card would result in points or rebates as previously described. The person receiving the Universal Bank Card would simply activate the card by contacting (as previously described) the offering bank and associating or linking the card with an existing bank account.

Accordingly, the Universal Bank Card could be distributed in conjunction with a live credit card as discussed above for FIGS. 1-2. The Universal Bank Card could be activated as discussed above for FIGS. 2-3. Activation would include the customer providing a bank account number for an existing bank account to be linked. Customers might also be permitted to periodically change the underlying bank account linked to the universal bank account number.

The Universal Bank Card could provide a reward/rebate feature tied to bank card usage, longevity, and the like, as reflected in FIG. 5. Such a reward/rebate feature could be a stand-alone reward/rebate feature, or it could be integrated with a credit card usage reward/rebate feature as in FIG. 5. The reward/rebate feature could be implemented as a co-branded feature such that rewards/rebates would be generated based on general card usage, but could be applied only to the co-brand partner (e.g., points only redeemable at partner Store X). Other variations are possible. For example, the rewards/rebates might be generated based on specific card usage with the co-brand partner (e.g., based only on usage at Store X), and could be applied specifically only to the co-brand partner (redeemable only at partner Store X) or could be applied generally (redemption not limited to co-brand partner).

A Universal Bank Card implemented with a rewards feature allows a consumer to associate an existing bank account with the universal bank account in order to get reward value otherwise not available. This reward value can in whole or in part be effectively funded through the transaction fee revenue generated for the sponsoring bank. For example, if the Universal Bank Card is implemented as an off-line signature-based card, transactions (e.g., at a merchant POS) will be routed through a national interchange such as the VISA® or MasterCard® interchange to the sponsoring bank holding the universal bank account (instead of the bank holding the linked bank account). As such, the sponsoring bank (instead of the bank holding the underlying bank account) will receive transaction revenue for each purchase. This revenue provides a mechanism for the sponsoring bank to effectively share profits with the universal account holders through rebate programs or similar programs.

Therefore, transactions using the Universal Bank Card will be routed to the sponsoring bank, which will approve or decline them. In so doing, the sponsoring bank may contact the bank holding the linked bank account (hereinafter, the "linked bank") at that time or at a later time. Preferably, the sponsoring bank will issue relatively immediate approvals, and will contact the linked bank at a later time to settle the transactions. For example, the sponsoring bank may initiate ACH transactions transferring funds from the linked bank to the sponsoring bank. Alternatively, the sponsoring bank may hold a certain volume ("stock") of funds (e.g., $500) acquired from the underlying bank account so that such funds are always available for transactions using the Universal Bank Card. Periodically, the stock will need to be replenished by ACH transfer, EFT transfer, or other transfer from the underlying bank account.

In implementing the Universal Bank Card, the sponsoring bank may set certain rules for approving transactions using the card. Just by way of example, there might be a limit of $200/transaction and no more than 5 transactions/day.

The Universal Bank Card could be distributed along with a live credit card as reflected in FIG. 6, except that the bank account number 626 would be a universal bank account number that would be linked with an underlying existing bank account number provided by the customer. The Universal Bank Card could also be distributed with a co-branded credit card as reflected in FIG. 7 where, as with FIG. 6, the bank account number 742 would be a universal bank account number to be linked to an existing bank account number.

The Universal Bank Card could be distributed without reference to a credit card as discussed with reference to FIG. 8. Distributing a Universal Bank Card according to FIG. 8 permits several modifications to the method described thereby. First, the step 814 of determining if the person is an existing bank account holder may optionally be omitted. This is because some persons already holding accounts with the Universal Bank Card sponsoring bank may also hold accounts with other banks. Therefore, such persons may be interested in a Universal Bank Card that could be linked to their existing bank account with the different bank. Steps 818 and 822 may be omitted for similar reasons. Step 826 may optionally be implemented because, while a Universal Bank Card holder will have some level of creditworthiness by virtue of holding a valid underlying bank account, there is still some level of risk to the sponsoring bank justifying a credit check. If so, a preliminary approval may be determined at 830, and a universal bank account may be prebuilt at 834. At 838, the Universal Bank Card can be created (e.g., embossed and written), including the embossing of the universal bank account number which, at the time of activation, the customer will link to an existing bank account. At 842, the Universal Bank Account card can be distributed.

The linking of the universal bank account number to the existing bank account number may be implemented at a processing center maintained by the sponsoring bank or its agents, which center may include one or more computers, servers, and databases for carrying the method into effect. Note also that such computers, servers, and databases may also be employed for carrying the methods of FIGS. 1-8 into effect.

As described above, the Universal Bank Account card can be considered a dead card within the scope of the present invention because it is an unsolicited card representing an offer from the sponsoring bank which the customer can accept by contacting the sponsoring bank and providing an existing bank account to be linked.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:
1. A method for distributing bank cards, comprising:
identifying, by at least one processor, a pool of potential new bank deposit account holders for a bank;
determining, by said at least one processor, if a person from the pool is an existing bank deposit account holder;

determining, by said at least one processor, whether the person is eligible for opening a new bank deposit account if the person is not an existing bank account holder;
creating an dead bank card comprising a dead deposit card associated with an inactive deposit account comprising a checking account or a savings account, the dead bank card and the inactive deposit account being unsolicited, the dead bank card including embossed information and magnetic stripe information specific to the person; and
distributing the dead bank card from the issuing bank to the person.

2. The method of claim 1, wherein the pool is identified based on the region or regions served by the bank issuing the new bank accounts.

3. The method of claim 1, wherein the pool is identified based on individuals applying for a new credit account.

4. The method of claim 1, wherein the pool is identified based on a life event comprising a move to a new residence.

5. The method of claim 1, wherein the pool is identified based on a life event comprising a marriage or divorce.

6. The method of claim 1, wherein the pool is identified based on a life event comprising a death of a partner or spouse.

7. The method of claim 1, wherein the pool is identified based on a life event comprising a birth.

8. The method of claim 1, wherein the pool is identified based on a life event comprising a new phone account.

9. The method of claim 1, further including determining whether the person was a previous bank account holder.

10. The method of claim 9, further including determining why the person closed the previous bank account in the event the person was a previous bank account holder.

11. The method of claim 1, wherein the step of determining whether the person is eligible comprises evaluating credit score information supplied by a credit bureau.

12. The method of claim 1, wherein the step of determining whether the person is eligible comprises determining whether the person is an existing or past credit card account holder with the bank and evaluating the payment history if the person is an existing or past credit account holder.

13. The method of claim 1, wherein the step of determining whether the person is eligible comprises evaluating the age of the person.

14. The method of claim 1, further comprising the step of prebuilding an account if the person is determined to be eligible, thereby permitting the bank to implement the new bank account quickly upon acceptance of the offer by the person.

15. The method of claim 1, wherein the bank card is a debit card or check card.

16. The method of claim 1, wherein the bank card is an ATM card.

17. A method of distributing bank cards, comprising:
receiving, via a communication interface, a customer application for a credit card to be issued by a bank;
processing, by at least one processor, the application to determine a decision on the credit card;
determining, by said at least one processor, whether the customer is an existing bank deposit account holder of the bank;
distributing a live credit card to the customer if the application is approved and the customer is an existing bank deposit account holder; and
distributing a live credit card and an unsolicited dead bank card comprising a dead deposit card associated with an inactive deposit account comprising a checking account or a savings account from the issuing bank to the customer if the application is approved and the customer is not an existing bank deposit account holder;
the dead deposit card and inactive deposit account being unsolicited and the dead bank card being delivered with embossed information and magnetic stripe information specific to the person.

18. The method of claim 17, further comprising the step of determining if the customer is eligible to be a bank account holder of the bank.

19. The method of claim 18, wherein the step of determining if the customer is eligible comprises determining whether the customer resides within the bank account service footprint of the bank.

20. The method of claim 18, wherein the step of determining if the customer is eligible comprises performing a credit check or risk analysis supplemental to that performed for the credit card application.

21. The method of claim 17, further comprising the step of determining whether the customer is a past bank account holder of the bank.

22. The method of claim 21, further comprising determining the reason the past bank account was closed and evaluating the reason prior to the decision to distribute a dead bank card to the customer.

23. The method of claim 21, further comprising the step of providing an incentive to a customer who is not an existing bank account holder, a first incentive being provided to a customer who is not an existing bank account holder and who is not a past bank account holder, and a second incentive being provided to a customer who is not an existing bank account holder and who is a past bank account holder, thereby providing different incentives to new bank account customers and past bank account customers.

24. The method of claim 17, wherein the live credit card and dead bank card are communicated to the customer in a single mailing.

25. The method of claim 17, wherein the live credit card and dead bank card are communicated to the customer in different mailings.

26. The method of claim 17, further comprising prebuilding a new bank account for the customer prior to distributing the dead bank card.

27. A method of distributing solicited credit cards and unsolicited bank cards, comprising:
receiving, via a communication interface, from a customer an application for a credit card to be issued by a bank;
processing the application by at least one processor;
determining, by said at least one processor, if the customer is an existing bank deposit account holder with the bank;
distributing a live credit card to the customer if the application is approved and the customer is already an existing bank deposit account holder;
distributing a live credit card and an unsolicited dead bank card comprising a dead deposit card associated with an inactive deposit account comprising a checking account or a savings account from the issuing bank to the customer if the application is approved and the customer is not an existing bank deposit account holder;
the dead deposit card and inactive deposit account being unsolicited and the dead bank card being delivered with embossed information and magnetic stripe information specific to the person; and
processing a customer response to the dead bank card.

28. The method of claim 27, wherein the customer response accepts the new bank account associated with the dead bank card, and wherein the processing comprises funding the new bank account.

29. The method of claim 28, wherein the funding is from a customer-supplied source of funds.

30. The method of claim 28, wherein the funding is from the credit account associated with the live credit card distributed with the dead bank card.

31. The method of claim 28, wherein the funding is an incentive deposit provided by the bank to incentivize the customer to accept the new bank account.

32. The method of claim 27, wherein the credit card and the bank card are linked through a reward or rebate program.

33. The method of claim 32, wherein the credit card is a cobranded credit card offering first rewards or rebates based on credit card usage, and the customer also receives second rewards or rebates based on bank card usage.

34. The method of claim 33, wherein the first rewards or rebates and second rewards or rebates are the same.

35. The method of claim 33, wherein the first rewards or rebates and the second rewards or rebates are different, thereby offering different levels of incentive to the customer to use the credit card and the bank card.

36. The method of claim 27, wherein the credit card is a cobranded credit card offering first rewards or rebates based on credit card usage, and the bank provides the customer an incentive deposit of rewards or rebates to accept the new bank account associated with the dead bank card.

37. The method for distributing bank cards according to claim 1, the method further comprising the recipient of the dead bank card opening the inactive account.

\* \* \* \* \*